(12) United States Patent
Folkins et al.

(10) Patent No.: US 9,738,032 B2
(45) Date of Patent: Aug. 22, 2017

(54) SYSTEM FOR CONTROLLING OPERATION OF A PRINTER DURING THREE-DIMENSIONAL OBJECT PRINTING WITH REFERENCE TO A DISTANCE FROM THE SURFACE OF OBJECT

(71) Applicant: Xerox Corporation, Norwalk, CT (US)

(72) Inventors: Jeffrey J. Folkins, Rochester, NY (US); Patricia J. Donaldson, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 390 days.

(21) Appl. No.: 14/298,047

(22) Filed: Jun. 6, 2014

(65) Prior Publication Data
US 2015/0352839 A1   Dec. 10, 2015

(51) Int. Cl.
*B41J 2/045* (2006.01)
*B29C 67/00* (2017.01)
*B33Y 50/02* (2015.01)

(52) U.S. Cl.
CPC ...... *B29C 67/0059* (2013.01); *B29C 67/0088* (2013.01); *B33Y 50/02* (2014.12)

(58) Field of Classification Search
CPC .................................................. B29C 67/0059
USPC ...................................................... 700/118
See application file for complete search history.

(56) References Cited

U.S. PATENT DOCUMENTS

| | | | | |
|---|---|---|---|---|
| 4,845,558 A * | 7/1989 | Tsai | ................. | G01N 21/95607 348/126 |
| 5,490,962 A | 2/1996 | Cima et al. | | |
| 5,775,402 A * | 7/1998 | Sachs | ...................... | B22C 9/065 164/4.1 |
| 6,146,567 A * | 11/2000 | Sachs | ...................... | B22F 3/004 118/313 |
| 6,200,646 B1 * | 3/2001 | Neckers | ................ | B29C 67/007 264/401 |
| 6,492,651 B2 * | 12/2002 | Kerekes | .............. | B29C 67/0059 250/548 |
| 6,508,980 B1 * | 1/2003 | Sachs | ...................... | B22F 1/007 419/26 |
| 7,198,826 B2 * | 4/2007 | Gardner | .............. | B29C 67/0059 427/258 |
| 7,270,528 B2 * | 9/2007 | Sherwood | ........... | B29C 35/0805 425/174.4 |
| 7,406,361 B2 * | 7/2008 | Ohmori | ............... | B29C 67/0088 264/401 |
| 7,780,897 B2 * | 8/2010 | Wicker | ............... | B29C 67/0055 264/233 |
| 7,931,914 B2 | 4/2011 | Pryce Lewis et al. | | |
| 8,017,055 B2 | 9/2011 | Davidson et al. | | |

(Continued)

*Primary Examiner* — Mohammad Ali
*Assistant Examiner* — Joshua Sanders
(74) *Attorney, Agent, or Firm* — Maginot Moore & Beck LLP

(57) ABSTRACT

A controller in a printer operates one or more printheads in the printer with reference to a predetermined height of material above a surface of a member and a height of a top layer of material above the surface of the member. The height of the top layer is identified with reference to a first sensor that generates data corresponding to a height of a face of one of the printheads above the surface of the member and a second sensor that generates data corresponding to a distance between the face of one of the printheads and the top layer of material.

13 Claims, 3 Drawing Sheets

(56) References Cited

U.S. PATENT DOCUMENTS

| | | | |
|---|---|---|---|
| 8,119,053 B1* | 2/2012 | Bedal | B29C 67/0077 264/308 |
| 9,168,328 B2* | 10/2015 | Sun | A61L 27/56 |
| 2005/0016451 A1* | 1/2005 | Edwards | B29C 67/0059 118/715 |
| 2011/0298881 A1* | 12/2011 | Silverbrook | B22F 3/008 347/110 |
| 2013/0283700 A1* | 10/2013 | Bajaj | B24B 37/26 51/295 |
| 2013/0328228 A1* | 12/2013 | Pettis | B29C 67/0081 264/40.1 |
| 2014/0020192 A1* | 1/2014 | Jones | A43B 13/14 12/146 B |
| 2014/0284832 A1* | 9/2014 | Novikov | B29C 67/0088 264/40.1 |
| 2014/0291886 A1* | 10/2014 | Mark | B29C 47/004 264/163 |

* cited by examiner

SYSTEM FOR CONTROLLING OPERATION OF A PRINTER DURING THREE-DIMENSIONAL OBJECT PRINTING WITH REFERENCE TO A DISTANCE FROM THE SURFACE OF OBJECT

TECHNICAL FIELD

The device disclosed in this document relates to printers that produce three-dimensional objects and, more particularly, to the accurate production of objects with such printers.

BACKGROUND

Three-dimensional printing is a process of making a three-dimensional solid object of virtually any shape from a digital model. One approach to three-dimensional printing uses an additive process in which one or more printheads eject successive layers of material on a substrate in different shapes. This approach to three-dimensional printing is also known as additive manufacturing. The substrate is supported on a platform that can be moved in one, two, or three dimensions by operation of actuators operatively connected to the platform. Additionally or alternatively, the printhead or printheads are also operatively connected to one or more actuators for controlled movement of the printhead or printheads to produce the layers that form the three-dimensional object. Three-dimensional printing is distinguishable from traditional object-forming techniques, which mostly rely on the removal of material from a work piece by a subtractive process, such as cutting or drilling.

The three-dimensional additive process is performed in a printer in a layer-by-layer manner. To operate the ejectors in the printhead(s) to form a layer, a three-dimensional raster processor receives a file of three-dimensional data of the part to be produced. These three-dimensional part data can be contained in a computer-aided design (CAD) file, for example. The processor uses these data to generate a raster data file, which contains data that correspond to each layer that forms the part. A printhead driver receives the raster data file and generates pixelated data that are used to operate the ejectors in the printhead(s) for the ejection of building and support material onto a support platen to form the part layer by layer. The printhead driver and a printer controller generate signals to coordinate the movement of the platen and the printhead(s) with the operation of the ejectors in the printhead.

The movement of the platen and printhead(s) in previously known printers is monitored with encoders and the like to enable the printer controller to operate actuators that move the platen and printheads in the horizontal plane to enable accurate positioning of those components. These position sensors can produce inaccurate readings, which can affect production of the part. Errors can also occur in the vertical direction. Sources of error in the vertical are inaccurate movement of the printhead, the platen, or both in the vertical direction, imprecise placement of the drops ejected by the printhead(s), and variation in the mass of the drops ejected from different inkjets or from mass variations occurring in inkjets over time. One way to address errors in the vertical direction is a planerizer. A planerizer contacts a surface of an object to remove excess material in a layer. One adverse impact of a planerizer is the waste of the removed material and the inaccurate operation of the planerizer that sometimes occurs. Consequently, operation of a printer capable of avoiding or compensating for vertical building errors would be advantageous.

SUMMARY

A printer that controls a printing operation in a manner that ensures more precise three-dimensional object formation includes a member having a surface configured to support formation of an object on the member, one or more printheads, each printhead being configured with ejectors to eject one or more materials, and a controller operatively connected to the printhead, the controller being configured to operate the one or more printheads to eject material onto the surface of the member or onto material previously ejected by the one or more printheads with reference to a predetermined height for each material above the surface of the member at a plurality of positions in a plane parallel to a portion of the surface of the member and the one or more printheads.

BRIEF DESCRIPTION OF THE DRAWINGS

The foregoing aspects and other features of a printer that controls a printing operation in a manner that ensures more precise three-dimensional object formation are explained in the following description, taken in connection with the accompanying drawings.

DETAILED DESCRIPTION

Figure 1:
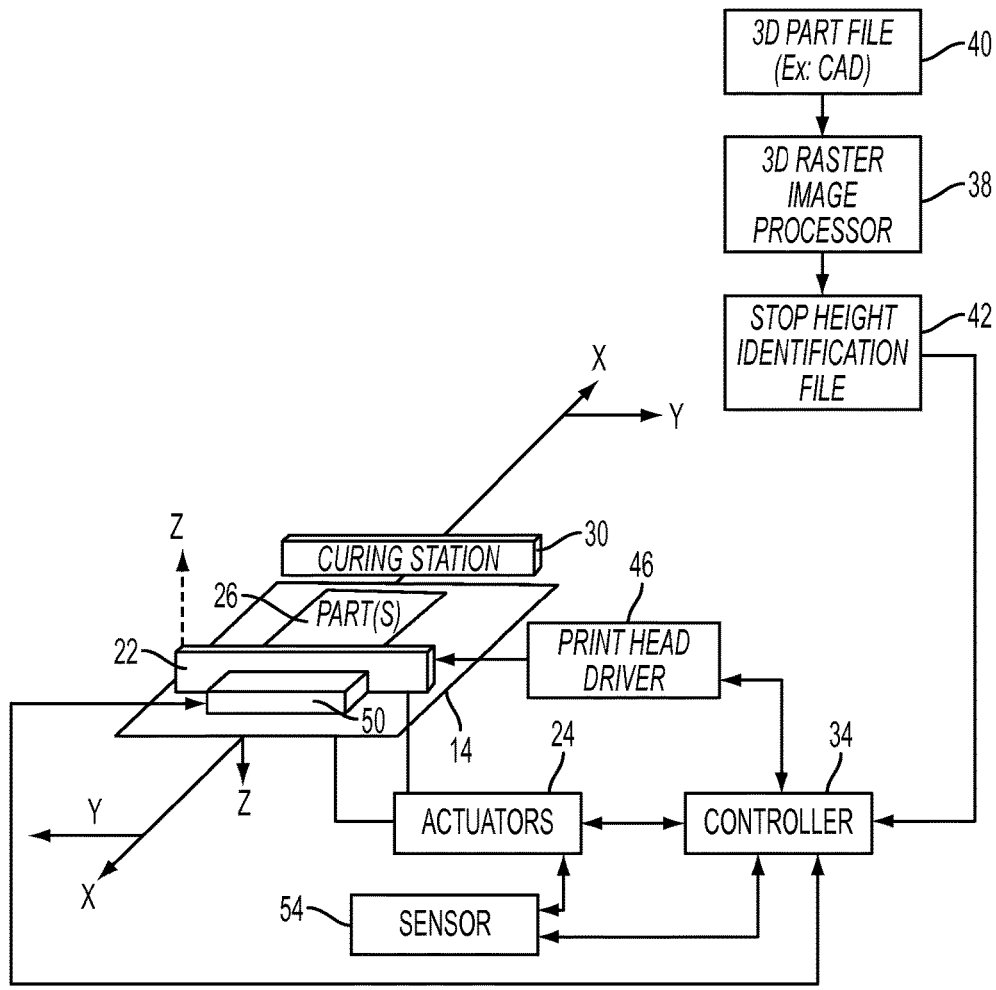
FIG. 1 is block diagram of a three-dimensional object printer that enables more precise printing of objects.

For a general understanding of the environment for the device disclosed herein as well as the details for the device, reference is made to the drawings. In the drawings, like reference numerals designate like elements.

As used herein, the terms "printer," "printing device," or "imaging device" generally refer to a device that produces an object with material ejected from a printhead. The term "printhead" as used herein refers to a component in the printer that is configured with ejectors fluidly connected to a source of build material or support material that are configured to eject drops of the connected material to form a three-dimensional object. A typical printhead includes a plurality of ejectors that eject drops of material in response to firing signals that operate actuators in the ejectors. The ejectors are arranged in an array of one or more rows and columns. In some embodiments, the ejectors are arranged in staggered diagonal rows across a face of the printhead. Various printer embodiments include one or more printheads to enable objects to be formed with more than one type of build material. As used herein, "voxel" means a volumetric pixel that identifies a volume of material at a particular location.

As used in this document, the term "build material" refers to material ejected by a printhead that forms one or more features of a part and "support material" refers to material ejected by a printhead that provides support for build material during part formation and is removed once the part is completed. The term "top layer of material" refers to a surface of the last ejected drop of material at a position on a part being formed. The term "profilometer" refers to an instrument that is configured to measure a distance from a reference point to a surface without contacting the surface. The term "encoder" refers to an instrument that converts rotational movement of an output shaft of an actuator to a linear distance measurement.

Figure 3:
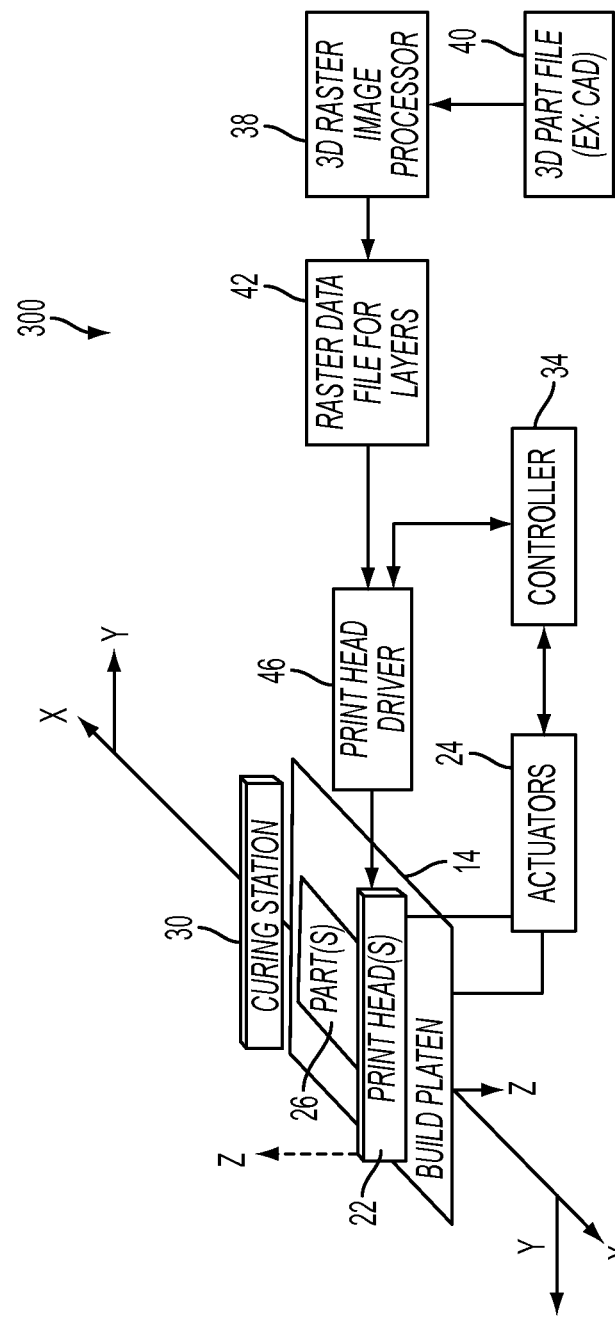
FIG. 3 is a block diagram of a prior art three-dimensional object printer.

FIG. 3 shows a configuration of components in a prior art printer 300, which produces a three-dimensional object or part 26. The printer 300 includes a support platen 14 on which one or more printheads 22 form an object or part 26. The printhead(s) are configured to eject one or more types of build material and support material to form the part 26. These materials can require curing so the printer 300 includes a curing device 30. In some embodiments that eject photopolymer building material, the curing device 30 is an ultraviolet (UV) radiation source. Additionally, a planerizer can be included to normalize the height of material in a layer formed on the object by the one or more printheads 22.

The printhead(s) 22 and support platen 14 are configured with actuators 24 and the like for movement. As shown in the figure, the support platen 14 is configured for movement along an X axis and the printhead(s) is configured to move along a Z axis, although the platen 14 could also be configured for movement along the Z axis. The movement of the platen 14 and the printhead(s) 22 are coordinated by a controller 34, which is operatively connected to the actuators 24 with which the platen and printhead(s) are configured for movement. In the figure, the printhead(s) 22 are wider along a Y axis than the part being built. Consequently, movement along the Y axis is not required. In some embodiments, the printhead(s) are not wider than the part so the platen 14 and/or printhead(s) 22 are configured for movement along the Y axis. In other embodiments, the resolution of the inkjets in the printheads is less than the resolution required for the part. In these embodiments, movement is also needed along the Y axis to build up a layer at the resolution required for the part. As used herein, the term "process direction" refers to movement along one axis in the surface of the support platen 14 and "cross-process direction" refers to movement along an axis in the support platen 14 that is orthogonal to the process direction axis in that platen. Thus, the process and cross-process directions in FIG. 3 refer to the X and Y axes. While the platen 14 of FIG. 3 is shown as a planar member, other embodiments of three-dimensional printers include platens that are circular discs, an inner wall or outer wall of a rotating cylinder or drum, or a rotating cone. The movement of the platen and the printhead(s) in these printers can be described with polar coordinates.

To operate the ejectors in the printhead(s), a three-dimensional raster processor 38 receives a file 40 of three-dimensional data of the part to be produced. These three-dimensional part data can be contained in a computer-aided design (CAD) file, for example. The processor 38 uses these data to generate a raster data file 42, which contains data that correspond to thin layers of the part. The printhead driver 46 receives the raster data file 42 and generates pixelated data that are used to operate the ejectors in the printhead(s) 22 for the ejection of building and support material onto the support platen 14 to form the part layer by layer. The printhead driver 46 and the controller 34 generate signals to coordinate the movement of the platen 14 and the printhead (s) 22 with the operation of the ejectors in the printhead.

As noted above, movement of the platen and printhead(s) in a prior art printer, such as printer 300, is monitored with encoders and the like to enable the controller 34 to control the positioning of those components accurately, but these encoders may produce erroneous positional data. Other sources of positional error, such as the components moving the platen and the printhead(s) or the imprecise placement of the drops ejected by the printhead(s), are not detected and can accumulate to a total error that requires the scrapping of the part. Additional contributors to positional error include changes and distortions in the part due to contraction and expansion of part occurring as the part continues to cool after a layer is deposited, the layer is reheated as the subsequent layers are built up, or by the chemistry arising from the curing of the materials in a layer. The magnitude of these contractions and expansions may change as the part is built because the ability of the part to absorb additional heat changes as the size of the part increases. In printers having a planerizer, inaccuracy in the operation of the planerizer can also contribute to positional error in a layer of an object.

To address these other sources of error, a printer has been developed that controls a printing operation in a manner that ensures more precise three-dimensional object formation. One embodiment of such a printer is shown in FIG. 1. Using like reference numerals for like components, the printer 100 includes a platen 14, printhead(s) 22, curing device 30, a controller 34, a raster image processor 38 that generates a height identification data file 42, and a printhead driver 46. Additionally, the printer in FIG. 1 also includes a distance sensor 50 and 54. Both sensors 50 and 54 are operatively connected to the controller 34. The sensor 50 can be attached to the printhead(s) 22 to enable the sensor to precede the printhead(s) 22 as the controller 34 operates the actuators 24 to move the printhead. Alternatively, the sensor 50 can be mounted to a sliding linear stage that is independent of the printhead(s) 22. In this embodiment, the controller 34 operates the actuators 24 to coordinate the movement of the sensor 50 and the printhead(s) 22 to eject material and to make measurements. Additionally, while sensor 50 is depicted as a single sensor in FIG. 1, sensor 50 can be comprised of a plurality of sensors. Alternatively, the sensor can be configured to measure the part profile from a single, stationary position.

The sensor 50 is configured to generate data corresponding to a distance between a face of the printhead 22 to which the sensor 50 is mounted and the top layer of material on an object. This distance is a printhead/part separation distance. In printers that eject one or more support materials and one or more build materials, sensor 50 can be configured to distinguish between the various types of materials. The sensor 50 can be an optical sensor, and, more particularly, can be a blue laser sensor available from Keyence Corporation of America, Itasca, Ill. in the LJ-V7000 series of two dimensional and three-dimensional laser measurement systems. This sensor can generate measurements of the distance between the printhead face and the top layer of the material beneath the printhead as well as positional data regarding the location of the top layer being measured. Alternatively, the sensor 50 can be any of a number of sensors that measure small distances very accurately, such as ultrasonic sensors and the like.

The sensor 54 is configured to generate data corresponding to a distance between a face of one or more of the printheads 22 and the surface of the platen 14. This distance is a printhead/platen separation distance. The sensor 54 can be an encoder that is configured to measure the amount of movement produced by an actuator 24 as the actuator moves a printhead or the platen, or both, relative to one another in the Z direction. The controller 34 receives the data generated by the sensor 50 and the data generated by the sensor 54 to identify a distance between the top layer of the material and platen at the position identified by the positional data generated by the sensor 50. The encoder or the like can be any of a number of sensors that measure small amounts of movement very accurately, such as optical encoders and the like. Sensor 54 can be physically the same sensor as sensor 50, but measuring a part of the platen that does not contain any build or support material.

As described above, three-dimensional data of a part can be provided in a format such as a CAD format. The three-dimensional raster image processor 38 produces a topographical view of the part from these data. The data identify the different materials in each column of voxels and the height for each material in each column. These height identification data for each voxel position to be formed by the printhead(s) 22 in the printer are provided to the controller 34 for operation of the printhead(s) 22. In effect, these height identification data provide a start and stop height in the Z direction for any material to be ejected for a layer at each voxel position in the X/Y plane of the part. Thus, the controller 34 operates the actuators 24 to position the printhead(s) 22 at an origin for the part at an initial separation distance between the platen and the printhead(s). Either the part 26 or the printhead(s) 22 are moved at a constant rate in a process direction while the printhead(s) 22 are operated to form a layer of the part. The controller 34 operates the printhead(s) 22 with the printhead driver 46 to activate one or more ejectors in the printhead(s) to eject one or more drops of material onto the part at locations where the part height is above the start height, but below the stop height for the material ejected at each location. The controller can change the operation of the inkjets in response to a difference between the material height and the stop height being less than a predetermined threshold as explained in more detail below. The printhead(s) 22 can also be moved in the cross-process direction between scans in the process direction, if the printhead(s) 26 do not extend the width of the part in the cross-process direction until an entire layer of material has been ejected onto the part. The part can pass under one or more other printhead(s) that eject different build or support materials. The height identification data identifies the start and stop heights for each material ejected by these other printheads to enable a single layer to be formed with multiple materials. Once all the voxels in the layer have been printed either to the stop height or to the maximum number of drops or height allowed per layer, the part may be moved to a curing station for the currently printed layer to be cured or hardened. After the last printed layer is cured or hardened, the next layer of the part can be printed in the manner described above. The controller 34 continues to form a layer and cure or harden the layer until all of the voxels defining a part have been filled with the appropriate material or materials.

This method of operating a printer is particularly advantageous with printhead drivers that can change firing signal parameters to adjust the volume of the ink drops ejected by the ejectors in a printhead. For example, in response to a difference between a height of a material in a voxel currently being printed and a stop height for the material in the voxel becoming less than a predetermined threshold, the controller can operate the printhead driver to eject drops of the material at a smaller volume. This change in printhead operation enables the height of the ejected material in the voxel to arrive at or near the stop height with greater precision. In some embodiments, the sensed height of a layer can be calculated or measured after printing with one material. If another material is to be ejected into the voxel of the currently printed layer, the controller uses this calculated height to operate the printhead driver to eject one or more drops of the next material into the voxel with a volume appropriate for either filing the voxel or reaching the stop height for the next material in the voxel. As a consequence, the tolerances for the dimensions of a printed part can be finer than with parts made with previously known printers and a planerizer or other trimmer may not be required to remove excess material from a layer. Additionally, being able to sense or react to height differences enables parts to be formed with different or enhanced properties. As used herein, "properties" refers to measureable parameter of a material such as smoothness, color, hardness, and the like. For example, the interior of a part could be filled with a material with some desired property, but with undesirable shrinkage characteristics, or softness. The part could then be finished with a desired, but possibly more expensive, surface material having different properties, such as increased hardness, or minimal shrinkage, to allow fine features to be accurately developed. This control based on a difference between a material height and the predetermined height being less than a predetermined threshold can also enable changes in the printer operation and curing properties. As used herein, "printer operation" refers to any operational parameter of a printer, such as the process direction speed of either the printheads or the platen, the volume of the ejected ink drops, the ejection frequency of the printheads, the scanning speed of the sensor or sensors, and the like. In this document, "curing properties" refer to any parameter affecting the curing of material, such as the intensity level of the curing radiation, the speed at which radiation is passed over the layer, or the frequency at which the curing station is used.

In other embodiments, the sensor 50 is configured to detect materials with different properties by identification of the color of the materials. Identification of a material through the identification of the material's color can be used to affect the volumes of the ejected ink drops, the printer operation, the curing properties as noted above with regard to the difference between a material height and its stop height being less than a predetermined threshold.

Figure 2:
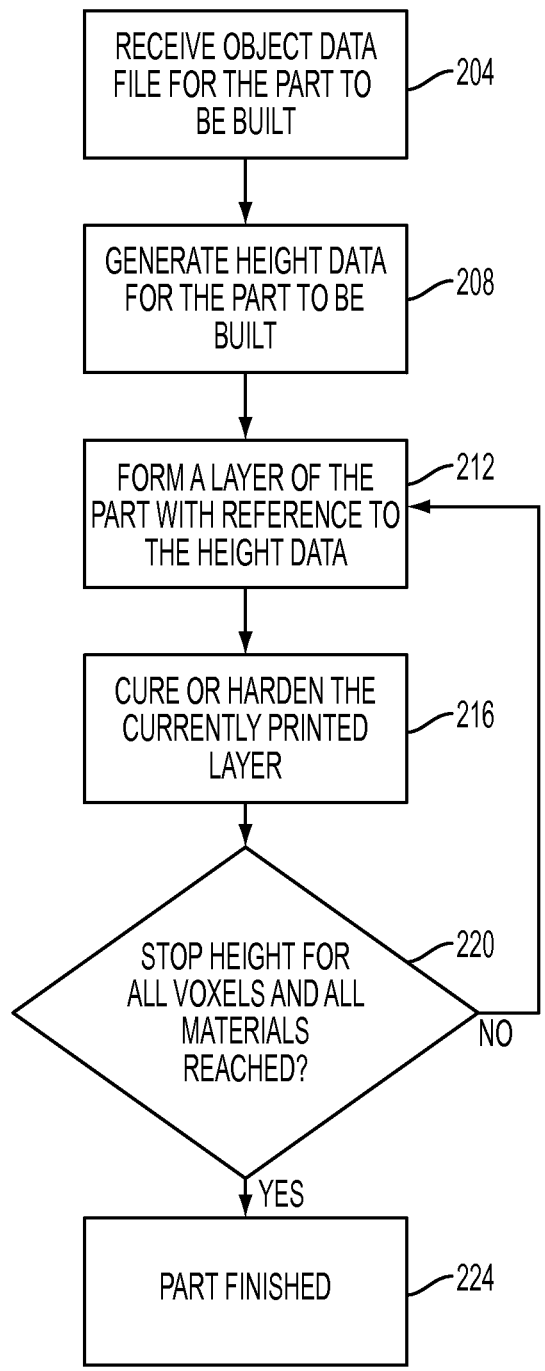
FIG. 2 is a flow diagram of a method for operating the module of FIG. 3.

A method of operating a printer that compensates for measured errors in three-dimensional objects during their printing is shown in FIG. 2. In the description of this method, statements that a process is performing some task or function refers to a controller or general purpose processor executing programmed instructions stored in a memory operatively connected to the controller or processor to manipulate data or to operate one or more components in the printer to perform the task or function. The controller 34 noted above can be such a controller or processor. Alternatively, these controllers can be implemented with more than one processor and associated circuitry and components, each of which is configured to form one or more tasks or functions described herein.

At the beginning of an object printing operation, the raster image processor receives a data file of three-dimensional data of a part (block 204). For each layer of the part, the processor uses the data in the file to generate height data that identify the different materials in each layer and the height for each material in each layer (block 208). These height identification data for each voxel position to be formed by the printhead(s) 22 in the printer are provided to the controller 34 for operation of the printhead(s) 22. For each layer, these height identification data provide a start and stop height in the Z direction for any material to be ejected in the layer at each voxel position in the X/Y plane of the part. The controller 34 operates the actuators 24 and the printhead(s) 22 to move either the part or the printhead(s) 22 at a constant rate in a process direction while the printhead(s) 22 are operated to form a layer of the part (block 212). Once all the voxels in the layer have been printed either to the stop height or to the maximum number of drops allowed per layer, the part may be moved to a curing station for the currently printed layer to be cured or hardened (block 216). If the stop height has not been reached at each voxel position for each material to be printed (block 220), the next layer of the part is printed (block 212) and the process continues (block 216) until the stop height is reached for all materials at each voxel position (block 224).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
a member having a surface configured to support formation of an object on the member;
one or more printheads, the one or more printheads configured with ejectors to eject two or more materials, wherein the two or more materials are of different properties; and
a controller connected to the one or more printheads, the controller configured to operate the one or more printheads to eject drops of a first material of the two or more materials onto the surface of the member or onto material previously ejected by the one or more printheads, to fill a plurality of voxels to a predetermined stop height for material ejected from the one or more printheads;
a sensor configured to generate a first measurement corresponding to a distance between a face of at least one of the one or more printheads and the top layer of the first material in at least one voxel of the plurality of voxels, and to generate a second measurement corresponding to a distance between the face of the at least one printhead in the one or more printheads and the surface of the member; and
the controller being further configured to, with reference to the first measurement and the second measurement, determine a difference between the height of the first material in the at least one voxel of the plurality of voxels and the predetermined stop height for the material in the at least one voxel;
wherein the controller is further configured to eject at least a second material into the at least one voxel when determined that a second material is to be ejected; and
wherein the controller is further configured to eject drops of additional material comprising either the first material or at least the second material into the at least one voxel with a volume different than the drops of the first material ejected into the voxel to reach the predetermined stop height for the material in the at least one voxel, when said difference is less than a predetermined threshold.

2. The printer of claim 1, the sensor further comprising:
a first sensor configured to generate the first measurement;
a second sensor configured to generate the second measurement; and
the controller is operatively connected to the first sensor and the second sensor to receive the first measurement from the first sensor and to receive the second measurement from the second sensor.

3. The printer of claim 1, the controller being further configured to identify the distance between the surface of the member and the top layer of the first material in the at least one voxel of the plurality of voxels as a difference between the first measurement and the second measurement.

4. The printer of claim 2 wherein the first sensor is an optical sensor.

5. The printer of claim 4 wherein the optical sensor is a profilometer.

6. The printer of claim 2 wherein the second sensor is an encoder.

7. The printer of claim 1 wherein the member is a platen with a planar surface.

8. The printer of claim 1 wherein the member is circular and is configured to rotate in a plane parallel to the face of the printhead.

9. The printer of claim 1, the controller being configured to operate the one or more printheads at a first ejection frequency and to operate the one or more printheads at a second ejection frequency, which is different than the first ejection frequency, when said difference is less than the predetermined threshold.

10. The printer of claim 1 further comprising:
one or more actuators coupled to one or more printheads or the member; and
the controller being connected to the one or more actuators, the controller configured to operate the one or more actuators to move the one or more printheads or the member at a first speed while the printhead is being operated to eject drops of material and to operate the one or more actuators to move the one or more printheads or the member at a second speed, which is different than the first speed, while the printhead is being operated to eject drops of material when said difference is less than the predetermined threshold.

11. The printer of claim 1 further comprising:
one or more actuators coupled to the one or more printheads or the member; and
the controller being connected to the one or more actuators, the controller being configured to operate the one or more actuators to move the sensor at a first speed over the member to generate a plurality of first measurements and a plurality of second measurements and to operate the one or more actuators to move the sensor at a second speed, which is different than the first speed, over the member to generate another plurality of first measurements and another plurality of second measurements when said difference is less than the predetermined threshold.

12. The printer of claim 1 further comprising:
one or more actuators coupled to the member;
a curing station; and
the controller being connected to the curing station and the one or more actuators, the controller configured to operate the one or more actuators to move the member to a position opposite the curing station, to operate the curing station at a first intensity and to operate the curing station at a second intensity, which is different than the first intensity, when said difference is less than the predetermined threshold.

13. The printer of claim 1 further comprising:
one or more actuators coupled to the member;
a curing station;
the sensor further configured to detect a color of a previously ejected material; and
the controller being connected to the curing station and the one or more actuators, the controller configured to operate the one or more actuators to move the member to a position opposite the curing station, to operate the curing station at a first curing intensity and to operate the curing station at a second intensity, which is different than the first intensity, when a top layer of previously ejected material is detected as being a predetermined color.

\* \* \* \* \*